United States Patent
Loehr et al.

(10) Patent No.: US 12,348,459 B2
(45) Date of Patent: *Jul. 1, 2025

(54) EFFICIENT BWP OPERATION FOR SIDELINK OPERATION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,211

(22) Filed: Dec. 18, 2023

(65) Prior Publication Data

US 2024/0121066 A1    Apr. 11, 2024

Related U.S. Application Data

(63) Continuation of application No. 17/862,230, filed on Jul. 11, 2022, now Pat. No. 11,882,077, which is a
(Continued)

(51) Int. Cl.
| | |
|---|---|
| *H04W 56/00* | (2009.01) |
| *H04L 1/1607* | (2023.01) |
| *H04L 5/00* | (2006.01) |
| *H04W 72/23* | (2023.01) |
| *H04W 72/56* | (2023.01) |
| *H04W 92/18* | (2009.01) |

(52) U.S. Cl.
CPC .......... *H04L 5/0092* (2013.01); *H04L 1/1642* (2013.01); *H04L 5/0098* (2013.01); *H04W 72/23* (2023.01); *H04W 72/56* (2023.01); *H04W 92/18* (2013.01)

(58) Field of Classification Search
CPC ... H04L 5/0092; H04L 1/1642; H04L 5/0098; H04W 72/56; H04W 72/23; H04W 92/18
USPC ........................................................ 370/329
See application file for complete search history.

(56) References Cited

U.S. PATENT DOCUMENTS

2019/0364602 A1* 11/2019 Yi ...................... H04W 74/0833
2021/0160876 A1*  5/2021 Osawa .................. H04L 5/0091

OTHER PUBLICATIONS

Interdigital Inc., "On Uu-based Sidelink Resource Allocation and Configuration", 3GPP TSG RAN WG1 Ad-Hoc Meeting 1901 R1-1900801, Jan. 21-25, 2019, pp. 1-5.
(Continued)

*Primary Examiner* — Sai Ming Chan
(74) *Attorney, Agent, or Firm* — Kunzler Bean & Adamson

(57) ABSTRACT

Apparatuses, methods, and systems are disclosed for deactivation of a bandwidth part (BWP). A base station may be configured to transmit a first configuration for one or more uplink (UL) BWPs, for a carrier of a serving cell, where at least one UL BWP of the one or more UL BWPs is an active UL BWP associated with a first numerology. The base station may be further configured to transmit a second configuration for a sidelink (SL) BWP, for the carrier of the serving cell, wherein the SL BWP is associated with a second numerology, where the SL BWP is deactivated in response to the first numerology being different than the second numerology.

18 Claims, 8 Drawing Sheets

Related U.S. Application Data continuation of application No. 16/789,040, filed on Feb. 12, 2020, now Pat. No. 11,387,970.

(60) Provisional application No. 62/804,692, filed on Feb. 12, 2019.

(56) References Cited

OTHER PUBLICATIONS

Interdigital Inc., "Multiple SR Configurations in NR", 3GPP TSG-RAN WG2 #99bis R2-1710658, Oct. 9-13, 2017, pp. 1-3.

Samsung, "Remaining issues on bandwidth part configuration", 3GPP TSG-RAN WG2 NR #100 Meeting R2-1713868, Nov. 27-Dec. 1, 2017, pp. 1-6.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.

3GPP, "3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-474.

* cited by examiner

500

| Carrier Indicator (3 bits) | Lowest Index of the Subchannel allocation (0, 2, 3, 4, 5 bits) | Frequency Resource Location (0, 3, 6, 7, 8 bits) | Time Gap (4 bits) |
|---|---|---|---|
| | | | |

EFFICIENT BWP OPERATION FOR SIDELINK OPERATION

CROSS-REFERENCE TO RELATED APPLICATIONS

This application claims priority to U.S. Provisional patent application Ser. No. 17/862,230 entitled "EFFICIENT BWP OPERATION FOR SIDELINK OPERATION" and filed on Jul. 11, 2022 for Joachim Loehr, Prateek Basu Mallick, and Karthikeyan Ganesan, which application is incorporated herein by reference. Application Ser. No. 17/862,230 claims priority to U.S. Provisional patent application Ser. No. 16/789,040 entitled "EFFICIENT BWP OPERATION FOR SIDELINK OPERATION" and filed on Feb. 12, 2019 for Joachim Loehr, Prateek Basu Mallick, and Karthikeyan Ganesan, which application (now issued as U.S. Pat. No. 11,387,970) is incorporated herein by reference. Application Ser. No. 16/789,040 claims priority to U.S. Provisional Patent Application No. 62/804,692 entitled "EFFICIENT BWP OPERATION FOR SIDELINK OPERATION" and filed on Feb. 12, 2019 for Joachim Loehr, Prateek Basu Mallick, and Karthikeyan Ganesan, which application is incorporated herein by reference.

FIELD

The subject matter disclosed herein relates generally to wireless communications and more particularly relates to selectively deactivating a bandwidth part in the case of a numerology mismatch between an uplink bandwidth part and a sidelink bandwidth part.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Absolute Radio Frequency Channel Number ("ARFCN"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFI"), Base Station ("BS"), Binary Phase Shift Keying ("BPSK"), Bandwidth Part ("BWP"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Discontinuous Transmission ("DTX"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop ("NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Cell Identity ("PCP"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tracking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Sidelink ("SL"), Sidelink Control Information ("SCP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Subcarrier Spacing ("SC S"), Supplementary Uplink ("SUL"), Subscriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UNITS"), UNITS Subscriber Identification Module ("USIM"), UMTS Terrestrial Radio Access ("UTRA"), UNITS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, sidelink transmission allows one UE device to communicate directly with another UE, e.g., via device-to-device ("D2D") communications. Bandwidth part operation adapts the size of the bandwidth used for data transmission (e.g., on a wideband carrier). In Rel-15 3GPP networks, a serving cell may be configured with up to four uplink bandwidth parts.

BRIEF SUMMARY

Disclosed are procedures for selectively deactivating a bandwidth part. One method of a UE for selectively deactivating a bandwidth part includes receiving one or more UL bandwidth part ("BWP") configurations for a serving cell, including an active UL BWP and receiving a SL BWP configuration for the same serving cell, wherein the SL BWP is associated with a first numerology. The method includes identifying a second numerology of the active UL BWP and determining whether the first numerology matches the second numerology. The method includes selectively deactivating one of the SL BWP and the active UL BWP if the first numerology does not match the second numerology.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
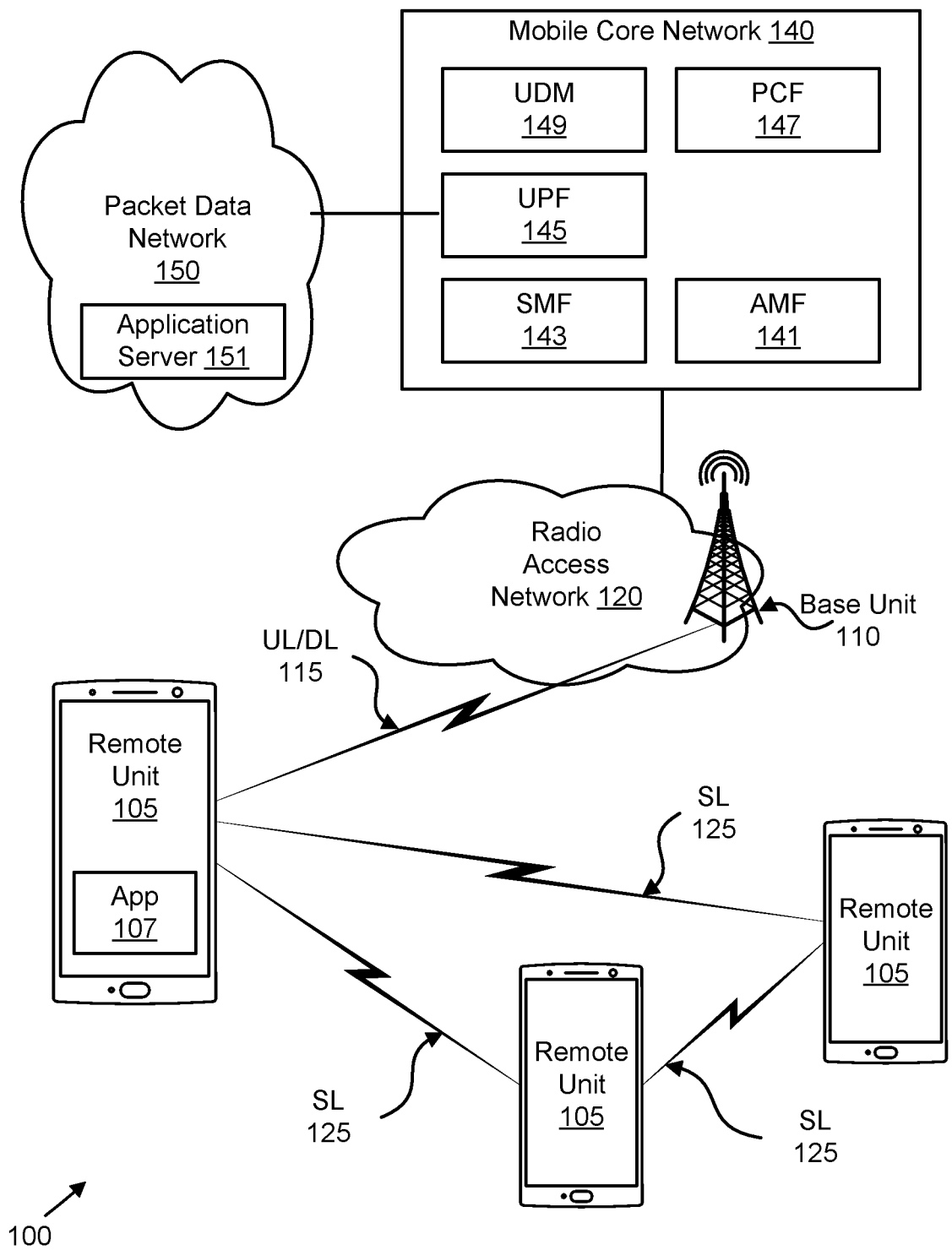
FIG. 1 is a schematic block diagram illustrating one embodiment of a wireless communication system for selectively deactivating a bandwidth part.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for bandwidth part operation for remote units 105 engaged in sidelink (e.g., vehicular) communication. In various embodiments, sidelink ("SL") communication uses the PC5 interface. Sidelink communications may allocate (unused) UL resources to communicate device-to-device with another UE.

To enable Bandwidth adaption, i.e., adapting the size of the bandwidth used for data transmission in a serving cell the gNB configures the UE with UL and DL Bandwidth Part(s) (BWP). In paired spectrum, DL and UL can switch BWP independently. In unpaired spectrum, DL and UL switch BWP simultaneously. Switching between configured BWPs happens by means of a DCI, i.e. PDCCH indicating to switch to another Bandwidth part, or inactivity timer. When an inactivity timer is configured for a serving cell, the expiry of the inactivity timer associated to that cell may switch from the active BWP to a default BWP configured by the network.

In certain embodiments, a Serving Cell may be configured with up to four BWPs, and for an activated Serving Cell, there is always one active BWP at any point in time. While the present disclosure assumes a maximum of four BWPs per Serving Cell, the principles described herein apply to other wireless communication systems supporting more BWPs per serving cell.

The BWP switching for a Serving Cell is used to activate an inactive BWP and deactivate an active BWP at a time and is controlled by the PDCCH indicating a downlink assignment or an uplink grant. Upon addition of SpCell or activation of an SCell, one BWP is initially active without receiving PDCCH indicating a downlink assignment or an uplink grant.

On the active BWP for each activated Serving Cell configured with a BWP, the MAC entity is to apply normal operations. This includes transmitting on UL-SCH, transmitting on RACH, monitoring the PDCCH, transmitting PUCCH, receiving DL-SCH, and (re-)initializing any suspended configured uplink grants of configured grant Type 1 according to the stored configuration.

On the inactive BWP for each activated Serving Cell configured with a BWP, the MAC entity is not to transmit on UL-SCH, is not to transmit on RACH, is not to monitor the PDCCH, is not to transmit PUCCH, is not to receive DL-SCH, is to clear any configured downlink assignment and configured uplink grant of configured grant Type 2, and is to suspend any configured uplink grant of configured Type 1.

If the active UL BWP has no PRACH resources configured, the UE shall upon triggering of a RACH procedure switch to the initial DL BWP and UL BWP and perform RACH procedure. If the MAC entity receives a PDCCH for BWP switching while a Random Access procedure is ongoing in the MAC entity, it is up to UE implementation whether to switch BWP or ignore the PDCCH for BWP switching. If the MAC entity decides to perform BWP switching, the MAC entity shall stop the ongoing Random Access procedure and initiate a Random Access procedure on the new activated BWP. If the MAC decides to ignore the PDCCH for BWP switching, the MAC entity shall continue with the ongoing Random Access procedure on the active BWP.

As mentioned before, the 3GPP Rel-15 NR specifications allow only one active BWP at a time. In Rel-15 each BWP has an associated numerology, i.e., each BWP supports only one numerology. For cases in Rel-15 when UE supports services requiring different numerologies, gNB needs to switch between different configured BWP(s). However, wireless networks may expect the UE to use the same numerology in the configured SL BWP and the active BWP in the same carrier at a given time.

Where only one SL BWP configured for a carrier/serving cell, it is not possible to switch to another SL BWP, e.g., to align with the numerology of current active UL BWP. Therefore, the SL BWP may be considered to be always active. Given the fact that there is only one SL BWP, the SL BWP is to be considered immediately active as soon as it is configured.

However, if at the time the SL BWP is configured the UL BWP in use at that point of time (when RRC Reconfiguration is received) has a different SCS/Numerology than the configured SL BWP, then management of the UL BWP is needed.

Disclosed herein are procedures and related signaling for efficient management of the configured UL and/or SL BWP in a carrier/serving cell, in particular for cases of a numerology mismatch between the active UL BWP and the configured SL BWP.

FIG. 1 depicts a wireless communication system 100 for selectively deactivating a bandwidth part, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the remote units 105 may communicate directly with each other (e.g., device-to-device communication) using sidelink ("SL") communication signals 125. Here, sidelink transmissions from a "transmitting" remote unit 105 may be broadcast, groupcast or unicast. Groupcast refers to group communications where the transmitting remote unit 105 in the group transits a multicast packet to all its group members.

While FIG. 1 depicts components of a 5G RAN and a 5G core network, the described embodiments for selectively deactivating a bandwidth part apply to other types of communication networks, including IEEE 802.11 variants, GSM, GPRS, UMTS, LTE variants, CDMA 2000, Bluetooth, ZigBee, Sigfoxx, and the like. For example, in an LTE variant involving an EPC, the AMF 141 may be mapped to an MME, the SMF 143 may be mapped to a control plane portion of a PGW and/or to an MME, the UPF 145 may be mapped to an SGW and a user plane portion of the PGW, the UDM/UDR 149 may be mapped to an HSS, etc.

To support BWP operation for SL communication, in particular where there is a mismatch between the active UL BWP's and the configured SL BWP's numerology, the remote unit 105 may be configured with a communication priority policy, e.g., a set of one or more communication priority rules.

In some embodiments, UL communication is prioritized over SL communication. Here, the SL BWP may be implicitly deactivated by the UE when the active UL BWP has a different numerology than the SL BWP. As used herein, "deactivated" means that no SL transmission and reception is supported for the serving cell/carrier when the (single) configured SL BWP is deactivated, e.g. no SL communication on the configured SL Resource Pools ("RPs"). Further, the phrase "implicitly deactivated" means that the remote unit 105 is to deactivate the SL BWP on the basis of the differing numerologies and without explicit signaling from the base unit 110 to the remote unit 105 to deactivate the SL BWP.

Moreover, in the UL-first priority scheme, the SL BWP may be implicitly activated by the UE when the active UL BWP has the same numerology than the SL BWP. As used herein, "activated" means SL transmission and reception is (again) available on the serving cell/carrier, e.g. the configured SL (Resource Pools) RPs are again usable for SL communication. Further, the phrase "implicitly activated" means that the remote unit 105 is to activate (e.g., reactivate) the SL BWP on the basis of the same numerologies and without explicit signaling from the base unit 110 to the remote unit 105 to activate the SL BWP. Note that an instruction to switch to a UL BWP with the same numerology as the configured SL BWP implicitly instructs the remote unit 105 to activate the SL BWP (which may have been deactivated previously).

In some embodiments, SL communication is prioritized over UL communication. Here, if the current UL BWP has a numerology that is different than the SL BWP, then the remote unit 105 may autonomously switch (e.g., without explicit instruction from the base unit 110) from the current UL BWP to a configured UL BWP which has the same numerology as the SL BWP. Where the remote unit 105 is configured with multiple UL BWPs having the same numerology as the SL BWP, then the remote unit 105 may refer to a rule governing which of the multiple UL BWPs the remote unit 105 is to switch to. In one example, the rule may instruct the remote unit 105 to switch to a UL BWP (of the multiple matching BWP) having a smallest BWP identifier.

Moreover, in the SL-first priority scheme, if there is no configured UL BWP with the same numerology as the SL BWP, then the remote unit 105 may deactivate the SL BWP.

In other embodiments, activation/deactivation of a configured SL BWP is to be explicitly signaled by the base unit 110. Here, the SL BWP may be activated/deactivated by a separate message from the DCI used to switch (activate/deactivate) the (UL) BWP. In certain embodiments, a control message is used to signal SL BWP activation/deactivation. In one embodiment, the control message is a compact DCI. In another embodiment, the control message is a MAC CE. In certain embodiments, SL BWP activation/deactivation is signaled by means of a SL resource allocation message. In certain embodiments, the SL BWP is activated a fixed (e.g., default) time after receiving an RRC reconfiguration message (e.g., to configure the same numerology as the UL BWP).

Figure 2:
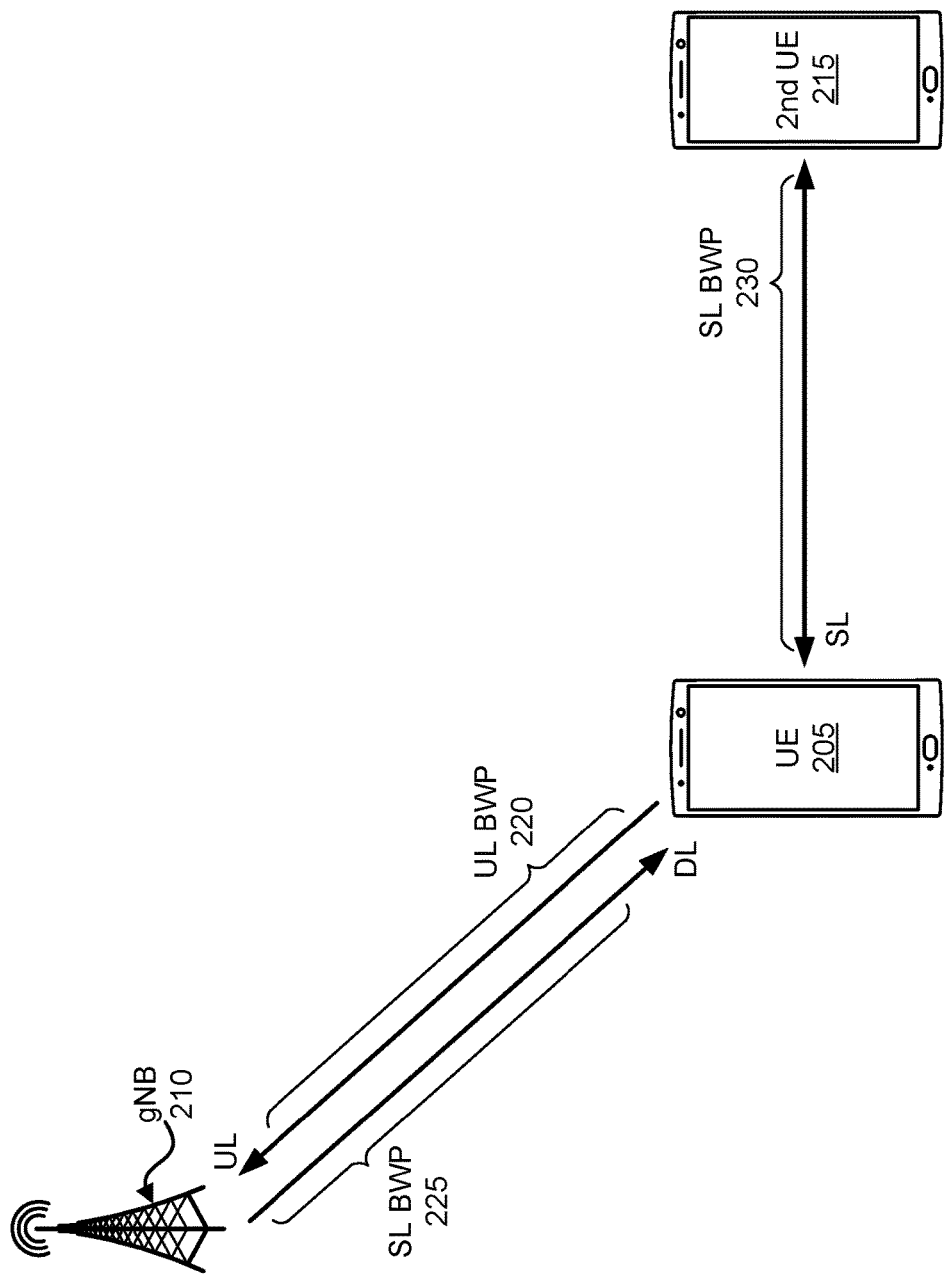
FIG. 2 is a diagram illustrating one embodiment of a network architecture for selectively deactivating a bandwidth part.

FIG. 2 depicts a network architecture 200 for selectively deactivating a bandwidth part, according to embodiments of the disclosure. The network architecture 200 includes a first UE 205 in communication with a gNB 210 and a second UE 215. Here, the first UE 205 is configured with a UL BWP 220, a DL BWP 225, and a SL BWP 230.

In the depicted embodiment, the UE 205 supports simultaneous UL BWP 220 and SL BWP 230 having the same numerology but does not support simultaneous UL BWP 220 and SL BWP 230 having different numerology. Accordingly, the UE 205 selectively deactivates a configured BWP (e.g., the SL BWP and/or a UL BWP) if a numerology mismatch is detected.

According to a first solution, the UE 205 deactivates the configured SL BWP 230 when the numerology of the active UL BWP 220 in a given carrier/serving cell differs from the numerology of the SL BWP 230 configured for the same carrier/serving cell. Deactivation of the SL BWP 230 is done autonomously in the UE 205. This solution is described in greater detail below with reference to FIG. 3.

According to a second solution, the UE 205 autonomously switches to a configured UL BWP 220 which has the same numerology as the SL BWP 230 in case the current active UL BWP's numerology is different compared to the numerology of the SL BWP 230. This solution is described in greater detail below with reference to FIG. 4.

According to a third solution, a network entity such as the gNB 210, explicitly activates/deactivates a configured SL BWP 230 by means of control signaling.

According to a fourth solution, the UE 205 is allowed to communicate on an active UL BWP 220 with a numerology different to the SL BWP's numerology in slots which are reserved for NR UL and which are at least a predefined time, e.g. x ms, ahead of the next slot configured for SL communication, i.e. there should be a gap of at least x ms between the NR UL operation and NR SL communication.

According to a fifth solution, the UE 205 upon receiving a RRC (Re)configuration message configuring a SL BWP 230 with a numerology not matching the active UL BWP's numerology, i.e., SL BWP's numerology is different than the active UL BWP's numerology, considers the configuration as invalid, i.e., the UE 205 is unable to comply with the configuration. As a consequence, the UE 205 ignores the RRC (re)configuration message, i.e. the UE 205 continues using the configuration used prior to the reception of RRCReconfiguration message.

According to a sixth solution, the UE 205 may ignore a PDCCH (DCI) ordering the UE 205 to switch to an UL BWP 220 associated with a numerology being different than the configured SL BWP's numerology. Similarly, the UE 205 may ignore an RRC message ordering the UE 205 to switch/activate an UL BWP 220 associated with a numerology being different than the configured SL BWP's numerology.

According to a seventh solution, the UE 205 is configured whether it should act according to the behavior described in the first solution, e.g. prioritizing UL over SL by autonomously deactivating SL BWP 230 in case of numerology mismatch, or whether it should act according to the behavior described in the second solution, e.g. prioritizing SL over UL by switching UL BWP 220 in case of numerology mismatch.

Figure 3:
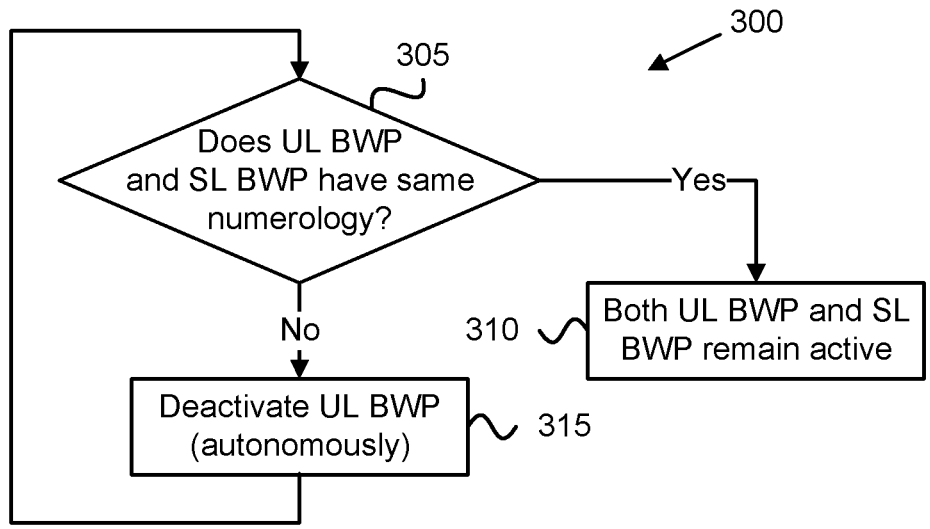
FIG. 3 is a flowchart diagram illustrating one embodiment prioritizing UL over SL.

FIG. 3 depicts a procedure 300 for selectively deactivating a configured BWP, according to embodiments of the disclosure. The procedure 300 may be implemented by a UE, such as the UE 205. The procedure 300 illustrates a first solution for BWP numerology mismatch. The UE determines whether the active UL BWP and the SL BWP have the same numerology (see block 305). If the active UL BWP and the SL BWP have the same numerology, then they both remain active (see block 310). Otherwise, according to the first solution, the UE 205 autonomously deactivates the SL BWP when a numerology mismatch is detected (see block 315).

In certain embodiments, such numerology mismatch may happen in case the gNB 210 orders the UE 205—e.g. by means of a PDCCH indicating a downlink assignment or an uplink grant or—to switch to one of the configured UL BWP 220 being associated with a different numerology than the numerology associated with the configured SL BWP 230. Another situation where such numerology mismatch may occur is when UE autonomously switches to the default/initial BWP being associated with a different numerology than the SL BWP 230. The UE 205 may switch to the default/initial BWP when e.g. no RACH resources are configured on the serving cell.

As discussed above, deactivating the SL BWP 230 is to be understood as disabling SL communication on the corresponding carrier/serving cell, e.g., the UE 205 cannot transmit or receive SL communication on the configured resource pools. For the case where the UE 205 has multiple active UL BWPs 220 for a carrier/serving cell, at least one of the numerologies associated with the active UL BWPs 220 needs to match the SL BWP's numerology, otherwise the UE 205 will autonomously deactivate the SL BWP 230, as described above.

Similar to the (implicit) deactivation of the SL BWP—when there is a mismatch between the active UL BWP's and the configured SL BWP's numerology—the UE 205 activates the configured SL BWP 230 when the active UL BWP's numerology is the same as the configured SL BWP's numerology. For example, when UE 205 switches to an UL BWP 220 with same numerology as the SL BWP's numerology—e.g. by network order—the UE 205 implicitly activates the SL BWP 230 (which was, for example, previously deactivated). Activating the SL BWP 230 is to be understood as enabling SL communication in the corresponding carrier/serving cell, e.g. the UE 205 can transmit or receive SL communication on the configured resource pools in the cell.

Figure 4:
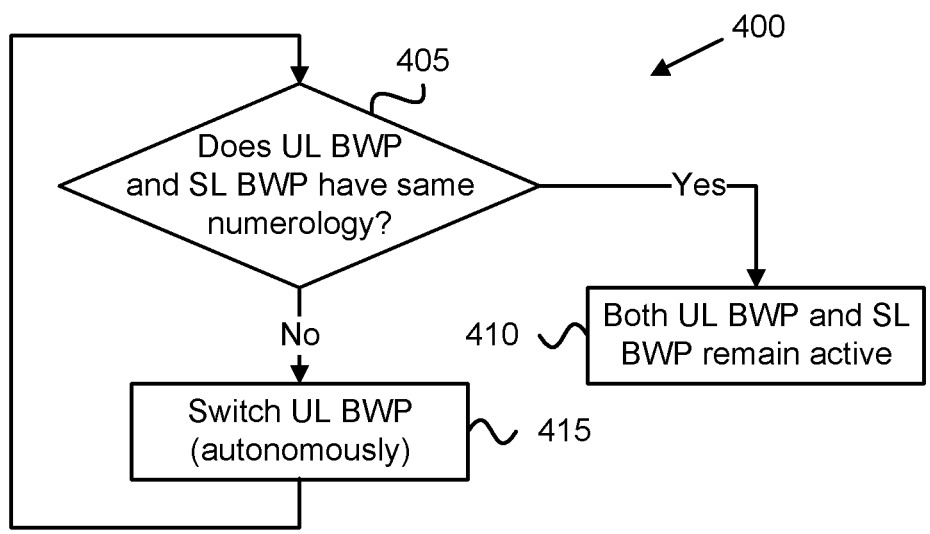
FIG. 4 is a diagram illustrating one embodiment of prioritizing SL over UL.

FIG. 4 depicts a procedure 400 for selectively deactivating a bandwidth part, according to embodiments of the disclosure. The procedure 400 may be implemented by a UE, such as the UE 205. The procedure 400 illustrates a second solution for BWP numerology mismatch. The UE determines whether the active UL BWP and the SL BWP have the same numerology (see block 405). If the active UL BWP and the SL BWP have the same numerology, then they both remain active (see block 410). Otherwise, according to the second solution, the UE 205 autonomously switches to a configured UL BWP which has the same numerology as the SL BWP upon detecting the numerology mismatch (see block 415).

In certain embodiments, such numerology mismatch (e.g., SCS mismatch) may happen in case the gNB 210 configured a SL BWP 230 for a carrier/serving cell being associated with a different numerology than the current active UL BWP's numerology. For cases when there are multiple configured UL BWPs 220 having the same numerology (e.g., SCS) as the SL BWP's numerology, the UE 205 may switch to one of the multiple configured UL BWPs 220 with the same numerology according to at least one of the following selections rules:

In one embodiment, the selected UL BWP is the one having the smallest BWP ID. In another embodiment, the selected UL BWP is the one having the highest BWP ID.

In certain embodiments, the selected UL BWP is the one having the largest overlap with the SL BWP, i.e. overlap of the UL BWP's PRB and the SL BWP's PRBs.

In one embodiment, the selected UL BWP is the default UL BWP, provided that the default UL BWP has the same numerology as the SL BWP. In another embodiment, the selected UL BWP is the initial UL BWP, provided that the initial UL BWP has the same numerology as the SL BWP.

Accordingly, the UE 205 tries to maintain both UL and SL communications by switching to a compatible UL BWP (e.g., one with the same numerology as the SL BWP). In one implementation of the second solution, the UE 205 deactivates the SL BWP 230 for cases when there is no configured UL BWP 220 having the same numerology as the SL BWP 230.

Figures 5, 6:
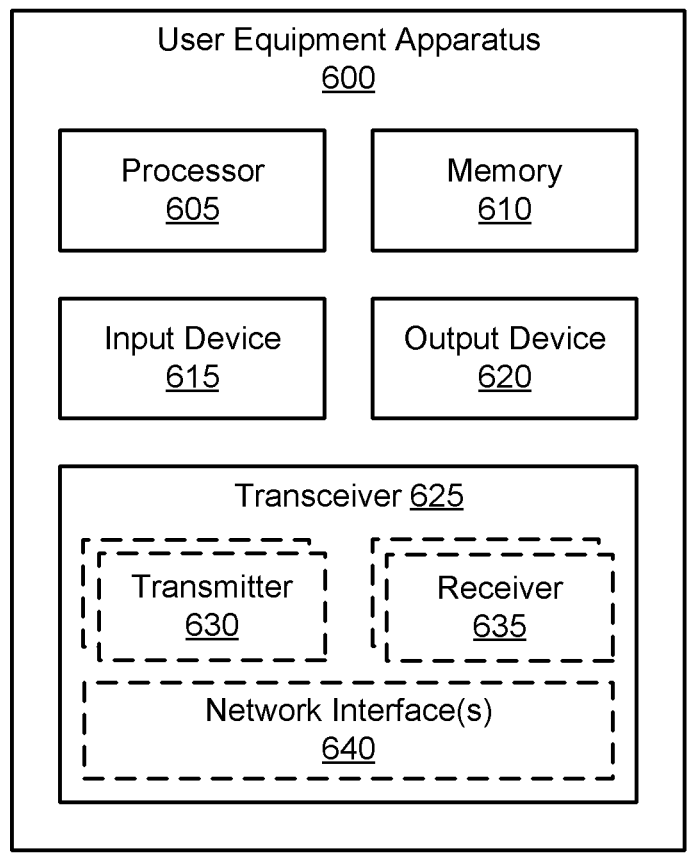
FIG. 5 is a diagram illustrating one embodiment of activation/deactivation information.
FIG. 6 is a diagram illustrating one embodiment of a user equipment apparatus that may be used for selectively deactivating a bandwidth part.

FIG. 5 depicts control signaling 500 for selectively activating/deactivating a bandwidth part, according to embodiments of the disclosure. The control signaling 500 may be transmitted by a RAN node, such as the gNB 210, to a UE, such as the UE 205. The control signaling 500 may be used to explicitly activate and/or deactivate a configured SL BWP.

According to the third solution, a network entity such as the gNB 210, explicitly activates/deactivates a configured SL BWP 230 by means of control signaling. For example, when a configured SL BWP 230 is currently deactivated, e.g. due to a mismatching numerology as described in the first embodiment, the gNB 210 may decide to quickly activate the SL BWP 230 in order to ensure that SL communication can be performed in the serving cell.

According to one implementation of the third solution, activating a SL BWP 230 by means of some explicit signaling may cause the UE 205 to deactivate/switch the current active UL BWP 220, e.g., for cases when the numerologies are not matching as explained in above embodiments.

According to some implementations of the third solution, the activation/deactivation information may be conveyed in an existing V2X control channel allocating resources for SL communication, e.g. as shown in FIG. 5.

A new field may be introduced in the existing V2X control channel indicating the activation/deactivation status of the SL BWP 230. Alternatively, a resource allocation on the SL BWP 230 may implicitly activate the SL BWP 230. Similarly, an invalid resource allocation may implicitly indicate to deactivate the SL BWP 230.

Alternatively, PHY signaling is used to activate/deactivate a SL BWP 230. For example, a new PDCCH format (e.g., DCI) may be used which indicates the UE 205 to activate (alternatively, deactivate) a configured SL BWP 230. The DCI may contain a flag indicating whether to activate or deactivate a configured SL BWP 230 which may be identified by some BWP ID being also signaled within the SL-DCI.

According to another implementation of the third solution, a DCI indicating the activation of an UL BWP 220 being associated with a different numerology (i.e., SCS) as the SL BWP's numerology implicitly deactivates the SL BWP 230.

According to a further implementation of the third solution, a MAC control element may be used to activate/deactivate a configured SL BWP 230. In one alternative, a configured SL BWP 230 is activated upon having received an RRC reconfiguration message configuring a SL BWP 230 having the same numerology as the active UL BWP's numerology, e.g., a fix/default time duration after having received the RRC message.

According to a fourth solution, the UE 205 is allowed to communicate on an active UL BWP 220 with a numerology different to the SL BWP's numerology in slots which are reserved for NR UL and which are at least a predefined time, e.g. x ms, ahead of the next slot configured for SL communication, i.e. there should be a gap of at least x ms between the NR UL operation and NR SL communication. It should be noted that all slots/subframes offering PRBs intended for PC5 (SL) communications constitute a SL Resource Pool. In order to allow sufficient time for switching the numerology, the UE 205 stops UL transmissions on the active UL BWP 220 a predefined time, e.g. x ms, before the next SL slot, i.e. slot/subframe belonging to the SL resource pool. Upon having stopped UL transmissions, e.g. deactivated the UL BWP 220, the UE 205 autonomously switches its numerology to the SL BWP's numerology in order to be able to perform SL communication in the next SL slot/subframe.

The predefined time used for switching the numerology may be for example derived based on RAN4 requirements with respect to BWP switching delay. Similarly, the UE 205 stops SL communication, e.g. deactivates the SL BWP 230, a predefined time before the next UL slot in order to switch the numerology to the active UL BWP's numerology.

According to the fifth solution, the UE 205 upon receiving a RRC (Re)configuration message configuring a SL BWP 230 with a numerology not matching the active UL BWP's numerology, i.e. SL BWP's numerology is different than the active UL BWP's numerology, considers the configuration as invalid, i.e. the UE 205 is unable to comply with the configuration. As a consequence, the UE 205 ignores the RRC (re)configuration message, i.e. the UE 205 continues using the configuration used prior to the reception of RRCReconfiguration message.

The UE 205 may according to one implementation of the fifth solution further trigger the connection re-establishment procedure. The behavior upon reception of a RRC reconfiguration message configuring a SL BWP 230 with a numerology different to the active UL BWP's numerology is according to another implementation of the fifth solution similar to the procedure "Inability to comply with RRCReconfiguration" specified in TS38.331.

Specifically, if the UE 205 is operating in EN-DC, then if the UE is unable to comply with (part of) the configuration included in the RRCReconfiguration message received over SRB3, the UE 205 is to continue using the configuration used prior to the reception of RRCReconfiguration message and is to initiate the SCG failure information procedure to report SCG reconfiguration error, upon which the connection reconfiguration procedure ends. Otherwise, if the UE 205 operating in EN-DC is unable to comply with (part of) the configuration included in the RRCReconfiguration message received over SRB1, the UE is to continue using the configuration used prior to the reception of RRCReconfiguration message and is to initiate the connection re-establishment procedure, upon which the connection reconfiguration procedure ends.

Otherwise, if the RRCReconfiguration is received via NR, then if the UE is unable to comply with (part of) the configuration included in the RRCReconfiguration message, the UE is to continue using the configuration used prior to the reception of RRCReconfiguration message and—if security has not been activated—the UE is to perform the actions upon going to RRC_IDLE, with release cause 'other'. However, if AS security has been activated but SRB2 and at least one DRB have not been setup, then the UE is to perform the actions upon going to RRC_IDLE, with release cause 'RRC connection failure'. Else, the UE is to initiate the connection re-establishment procedure, upon which the reconfiguration procedure ends.

According to another implementation of the fifth solution, the UE 205 goes to RRC_IDLE state upon reception of an RRC reconfiguration message configuring a SL BWP 230 with an associated numerology different than the active UL BWP's numerology.

According to a sixth solution, the UE 205 may ignore a PDCCH (DCI) ordering the UE 205 to switch to an UL BWP 220 associated with a numerology being different than the configured SL BWP's numerology. Similarly, the UE 205 may ignore an RRC message ordering the UE 205 to switch/activate an UL BWP 220 associated with a numerology being different than the configured SL BWP's numerology. According to one implementation of the sixth solution, the UE 205 doesn't switch to the default respectively initial UL BWP 220 in case the numerology associated with the default/initial UL BWP 220 is different to the SL BWP's numerology.

According to a seventh solution, the UE 205 is configured whether it should act according to the behavior described in the first solution, e.g. prioritizing UL over SL by autonomously deactivating SL BWP 230 in case of numerology mismatch, or whether it should act according to the behavior described in the second solution, e.g. prioritizing SL over UL by switching UL BWP 220 in case of numerology mismatch.

In one alternative implementation of the seventh solution, the UE 205 acts according to the behavior described in either the first or second solution depending on the priority of the logical channels configured for NR UL and SL. Where the NR traffic has a higher priority than the SL traffic, the UE 205 behaves prioritizes UL over SL in case of a numerology mismatch, as described above. Where the SL traffic has a higher priority than NR UL traffic (e.g. logical channel priority of SL LCHs/RBs are higher than logical channel priority of the NR LCHs/RBs), the UE 205 prioritizes SL over UL in case of a numerology mismatch, as described above.

Note that the priority of the different interfaces, e.g. NR-Uu and SL PC5, may be also defined by a V2X control function for a geographical area, i.e. in a certain geographical area (e.g. zone) NR-Uu (UL) is prioritized over SL leading in case of a numerology mismatch, whereas in other geographical areas SL PC5 operation is prioritized over Uu mandating the UE 205 to act according to the second solution.

According to another implementation of the seventh solution, the UE 205 switches in case of numerology mismatch to a UL BWP 220 having the same numerology as the SL BWP 230 if such a UL BWP 220 is configured; otherwise the UE 205 deactivates the SL BWP 230.

FIG. 6 depicts a user equipment apparatus 600 that may be used for selectively deactivating a bandwidth part, according to embodiments of the disclosure. In various embodiments, the user equipment apparatus 600 is used to implement one or more of the solutions described above. The user equipment apparatus 600 may be one embodiment of the UE 205, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the transceiver 625 receives sidelink bandwidth part ("BWP") configuration and also receives one or more uplink BWP configurations. The processor 605 may identify a first subcarrier spacing of the sidelink BWP, identify a second subcarrier spacing of an active uplink BWP, and determine whether the first subcarrier spacing matches the second subcarrier spacing. If the subcarrier spacings do not match, then the processor 605 selectively deactivates one of the sidelink BWP and the active uplink BWP.

In some embodiments, the processor 605 determines a priority of the sidelink BWP with respect to the active uplink BWP, wherein selectively deactivating one of the sidelink BWP and the active uplink BWP is based on the determined priority. In certain embodiments, the processor 605 determines a priority of the sidelink BWP with respect to the active uplink BWP, wherein selectively deactivating one of the sidelink BWP and the active uplink BWP is based on the determined priority. If the active uplink BWP has a higher priority than the sidelink BWP, then selectively deactivating one of the sidelink BWP and the active uplink BWP comprises deactivating the sidelink BWP.

In certain embodiments, the transceiver 625 receives an instruction to switch to a second uplink BWP, the second uplink BWP having a subcarrier spacing that matches that of the sidelink BWP. Here, the processor 605 reactivates the sidelink BWP in response to switching to the second uplink BWP.

In certain embodiments, the sidelink BWP is a higher priority than the active uplink BWP. In such embodiments, selectively deactivating one of the sidelink BWP and the active uplink BWP includes switching from the active uplink BWP to a second uplink BWP, the second uplink BWP having a subcarrier spacing that matches that of the sidelink BWP. Where multiple configured uplink BWPs have a subcarrier spacing that matches that of the sidelink BWP, the processor 605 selects the second uplink BWP from the multiple matching uplink BWPs using a selection rule.

In certain embodiments, selectively deactivating one of the sidelink BWP and the active uplink BWP comprises deactivating the sidelink BWP in response to none of the one or more uplink BWP configurations having a subcarrier spacing that matches that of the sidelink BWP. In certain embodiments, the transceiver 625 receives a control message from a network entity, wherein the processor 605 deactivates a specified one of the sidelink BWP and the active uplink BWP according to the control message.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to selectively deactivating a bandwidth part. For example, the memory 610 may store UL BWP configurations, SL BWP configurations, BWP numerologies, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. Additionally, the transceiver 625 may support at least one network interface 640. Here, the at least one network interface 640 facilitates communication with a RAN node, such as an eNB or gNB, for example using the "Uu" interface. Additionally, the at least one network interface 640 may include an interface used for communications with one or more network functions in the mobile core network, such as a UPF, an AMF, and/or a SMF.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
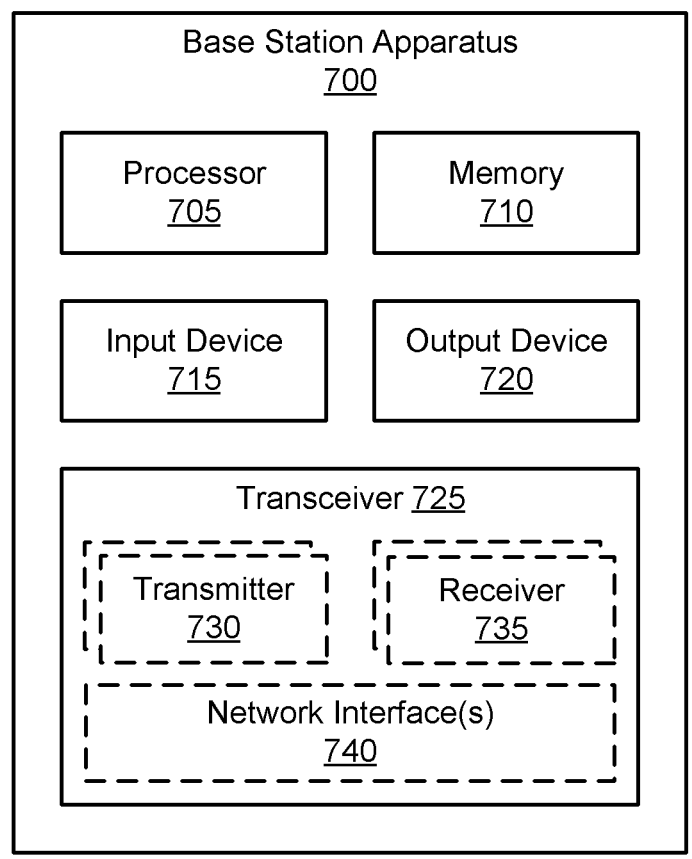
FIG. 7 is a diagram illustrating one embodiment of a base station apparatus that may be used for selectively deactivating a bandwidth part.

FIG. 7 depicts a base station apparatus 700 that may be used for selectively deactivating a bandwidth part, according to embodiments of the disclosure. The base station apparatus 700 may be one embodiment of the base unit 110, described above. Furthermore, the base station apparatus 700 may include a processor 705, a memory 710, an input device 715, an output device 720, and a transceiver 725. In some embodiments, the input device 715 and the output device 720 are combined into a single device, such as a touchscreen. In certain embodiments, the base station apparatus 700 may not include any input device 715 and/or output device 720. In various embodiments, the base station apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the base station apparatus 700 to perform the above describe behaviors. In some embodiments, the base station apparatus 700 sends to a UE (e.g., via the transceiver 725) one or more UL BWP configurations and a SL BWP configuration. Here, the one or more UL BWP configurations includes an active UL BWP. The SL BWP is associated with a first numerology and the active UL BWP is associated with a second numerology. If the first numerology does not match the second numerology, the UE selectively deactivates one of the SL BWP and the active UL BWP, as described above.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to selectively deactivating a bandwidth part. For example, the memory 710 may store UL BWP configurations, SL BWP configurations, BWP numerologies, and the like. In certain embodiments, the memory 710 also stores program code and related data, such as an operating system or other controller algorithms operating on the remote unit 105.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the base station apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein.

Similarly, one or more receivers 735 may be used to communicate with other network functions in the PLMN, as described herein. Although only one transmitter 730 and one receiver 735 are illustrated, the base station apparatus 700 may have any suitable number of transmitters 730 and receivers 735. Further, the transmitter(s) 725 and the receiver(s) 730 may be any suitable type of transmitters and receivers.

Figure 8:
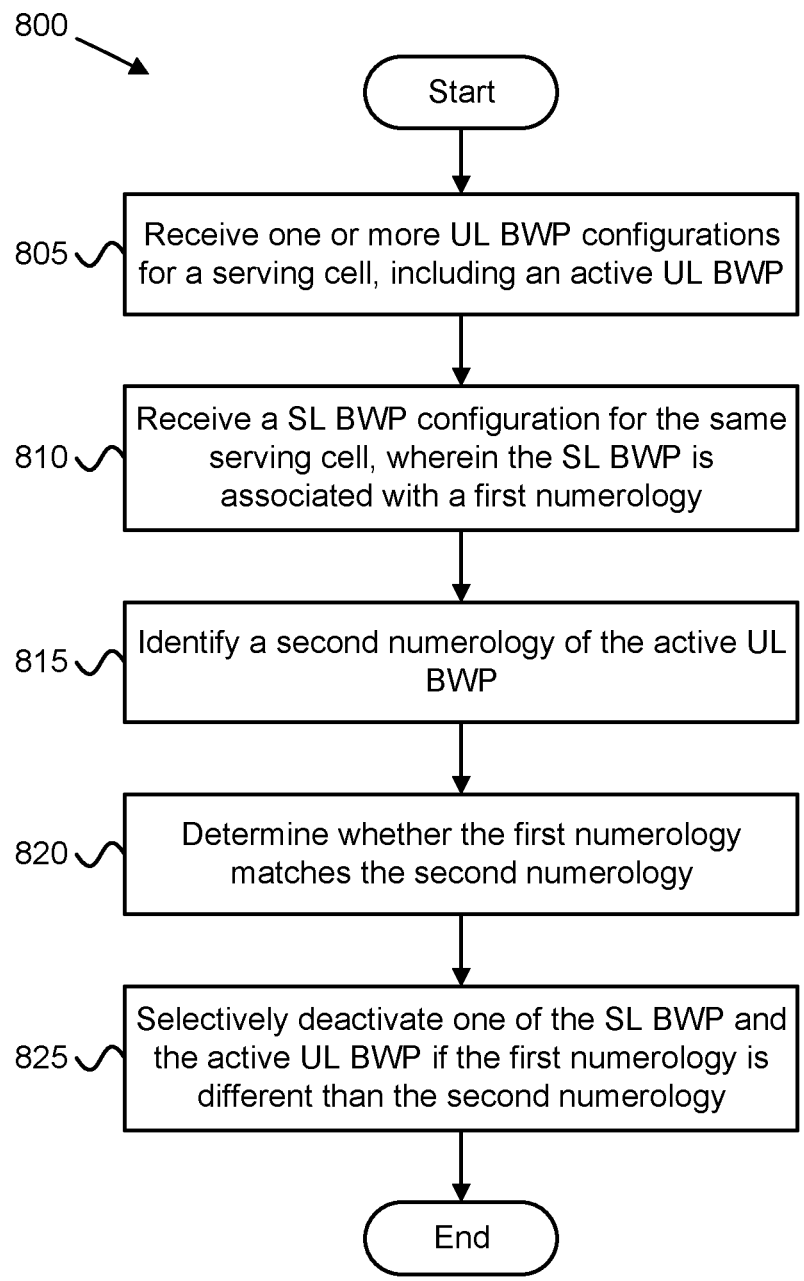
FIG. 8 is a flowchart diagram illustrating one embodiment of a first method that may be used for selectively deactivating a bandwidth part.

FIG. 8 depicts one embodiment of a method 800 for selectively deactivating a bandwidth part, according to embodiments of the disclosure. In various embodiments, the method 800 is performed by the remote unit 105, the UE 205 and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 one or more UL BWP configurations for a serving cell, including an active UL BWP. The method 800 includes receiving 810 a SL BWP configuration for the same serving cell, wherein the SL BWP is associated with a first numerology. The method 800 includes identifying 815 a second numerology of the active UL BWP.

The method 800 includes determining 820 whether the first numerology matches the second numerology. The method 800 includes selectively deactivating 825 one of the SL BWP and the active UL BWP if the first numerology is different than the second numerology. The method 800 ends.

Figure 9:
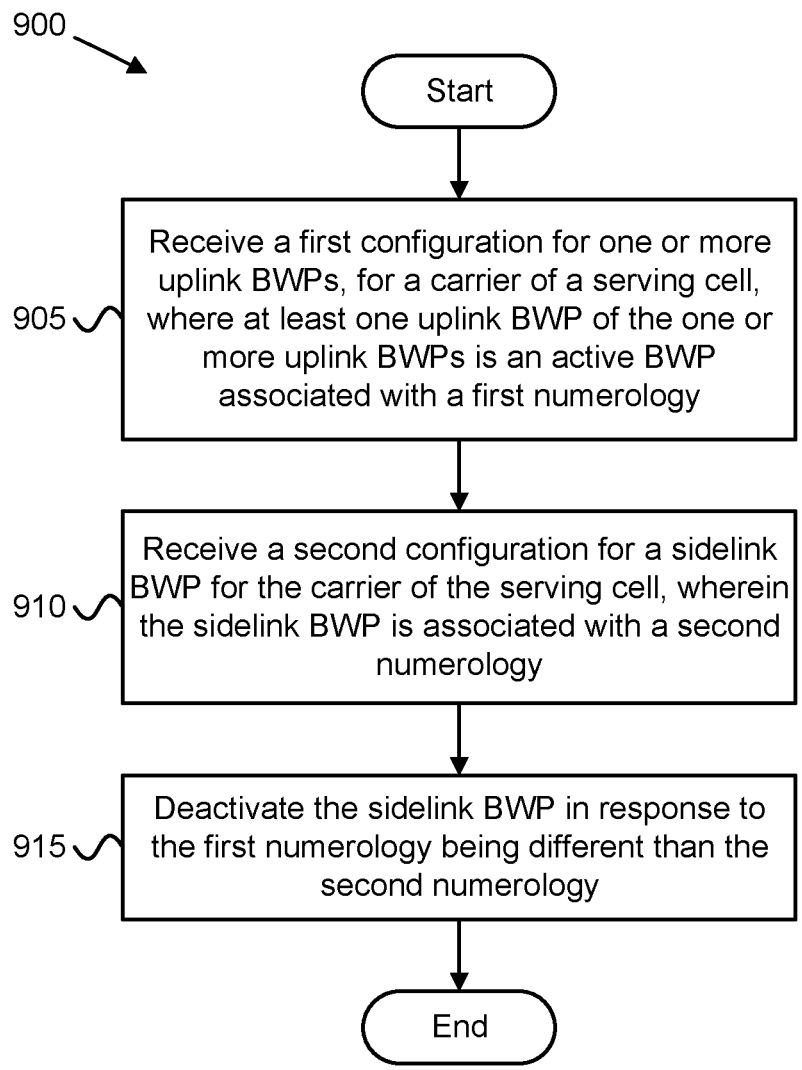
FIG. 9 is a flowchart diagram illustrating one embodiment of a second method in accordance with aspects of the present disclosure.

FIG. 9 depicts one embodiment of a method 900 for selectively deactivating a bandwidth part, according to embodiments of the disclosure. In various embodiments, the method 900 is performed by the remote unit 105, the UE 205 and/or the user equipment apparatus 600, described above. In some embodiments, the method 900 is performed by at least one processor, such as a microcontroller, a microprocessor, a CPU, a GPU, an auxiliary processing unit, a FPGA, or the like.

The method 900 begins and receives 905 a first configuration for one or more UL BWP, for a carrier of a serving cell. Here, at least one UL BWP of the one or more UL BWPs is an active UL BWP associated with a first numerology. The method 900 includes receiving 910 a second configuration for a SL BWP for the carrier of the serving cell. Here, the SL BWP is associated with a second numerology. The method 900 includes deactivating 915 the SL BWP in response to the first numerology being different than the second numerology. The method 900 ends.

Figure 10:
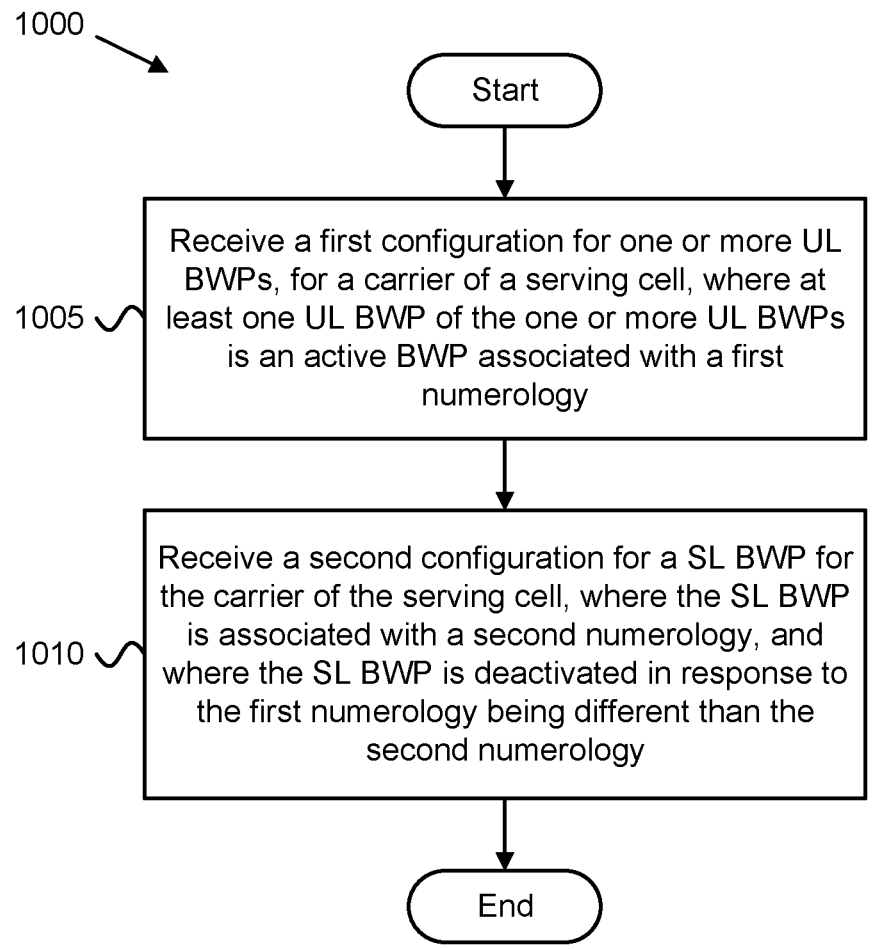
FIG. 10 is a flowchart diagram illustrating one embodiment of a third method in accordance with aspects of the present disclosure.

FIG. 10 depicts one embodiment of a method 1000 for selectively deactivating a bandwidth part, according to embodiments of the disclosure. In various embodiments, the method 1000 is performed by the base unit 110, a base station, the gNB 210, and/or the base station apparatus 700, described above. In some embodiments, the method 1000 is performed by at least one processor, such as a microcontroller, a microprocessor, a CPU, a GPU, an auxiliary processing unit, a FPGA, or the like.

The method 1000 begins and transmits 1005 a first configuration for one or more UL BWPs, for a carrier of a serving cell. Here, at least one UL BWP of the one or more UL BWPs is an active UL BWP associated with a first numerology. The method 1000 includes transmitting 1010 a second configuration for a SL BWP for the carrier of the serving cell. Here, the SL BWP is associated with a second numerology, and the SL BWP is deactivated in response to the first numerology being different than the second numerology. The method 1000 ends.

Disclosed herein is a first apparatus for selectively deactivating a bandwidth part, according to embodiments of the disclosure. The first apparatus may be implemented by a UE, such as the remote unit 105, the UE 205 and/or the user equipment apparatus 600. The first apparatus includes a transceiver that receives one or more UL BWP configurations and receives a SL BWP configuration. Here, the one or more UL BWP configurations includes an active UL BWP and the SL BWP is associated with a first numerology. The first apparatus also includes a processor that identifies a second numerology of an active UL BWP and determines whether the first numerology matches the second numerology. If the first numerology does not match the second numerology, the processor selectively deactivates one of the SL BWP and the active UL BWP.

In some embodiments, selectively deactivating one of the SL BWP and the active UL BWP includes deactivating the SL BWP, wherein the processor further stops SL communication on that serving cell. In further embodiments, the transceiver may receive an instruction to switch to a second UL BWP, the second UL BWP being associated with a numerology that matches that of the SL BWP. In such embodiments, the processor reactivates the SL BWP in response to switching to the second UL BWP.

In some embodiments, selectively deactivating one of the SL BWP and the active UL BWP includes the processor switching from the active UL BWP to a second UL BWP that has a numerology that matches that of the SL BWP. In such embodiments, multiple configured UL BWPs may have a numerology that matches that of the SL BWP. Accordingly, the processor selects the second UL BWP from the multiple matching UL BWPs using a selection rule.

In some embodiments, selectively deactivating one of the SL BWP and the active UL BWP includes the processor deactivating the SL BWP in response to none of the one or more UL BWP configurations being associated with a numerology that matches that of the SL BWP.

In some embodiments, the transceiver receives a control message from a network entity, the control message activating the SL BWP. In certain embodiments, selectively deactivating one of the SL BWP and the active UL BWP includes the processor deactivating the active UL BWP in response to activating the SL BWP according to the control message. In other embodiments, selectively deactivating one of the SL BWP and the active UL BWP includes the processor switching from the active UL BWP to a second UL BWP that has a numerology that matches that of the SL BWP in response to activating the SL BWP according to the control message.

In some embodiments, the transceiver receives a control message from a network entity, the control message activating a configured UL BWP being associated with a different numerology than the SL BWP. In such embodiments, selectively deactivating one of the SL BWP and the active UL BWP includes the processor deactivating the SL BWP in response to activating the UL BWP according to the control message.

In some embodiments, selectively deactivating one of the SL BWP and the active UL BWP includes the processor providing a communication gap between UL operation and SL operation and adjusting (e.g., retuning and/or reconfiguring) the transceiver to switch between the first numerology and the second numerology during the communication gap.

In some embodiments, the processor further determines a priority of the SL BWP with respect to the active UL BWP. In such embodiments, selectively deactivating one of the SL BWP and the active UL BWP includes the processor deactivating a lower priority one of the SL BWP and the active UL BWP.

Disclosed herein is a first method for selectively deactivating a bandwidth part, according to embodiments of the disclosure. The first method may be performed by a UE, such as the remote unit 105, the UE 205 and/or the user equipment apparatus 600. The first method includes receiving one or more UL BWP configurations for a serving cell and receiving a SL BWP configuration for the same serving cell. Here, the one or more UL BWP configurations for the serving cell includes an active UL BWP and the SL BWP is associated with a first numerology. The first method includes identifying a second numerology of the active UL BWP and determining whether the first numerology matches the second numerology. The first method includes selectively deactivating one of the SL BWP and the active UL BWP if the first numerology does not match the second numerology.

In some embodiments, selectively deactivating one of the SL BWP and the active UL BWP includes deactivating the SL BWP. In such embodiments, the first method further includes stopping SL communication on that serving cell. In certain embodiments, the first method also includes receiving an instruction to switch to a second UL BWP being associated with a numerology that matches that of the SL BWP and reactivating the SL BWP in response to switching to the second UL BWP.

In some embodiments, selectively deactivating one of the SL BWP and the active UL BWP includes switching from the active UL BWP to a second UL BWP that has a numerology that matches that of the SL BWP. In various embodiments, multiple configured UL BWPs have a numerology that matches that of the SL BWP. In such embodiments, the first method includes selecting the second UL BWP from the multiple matching UL BWPs using a selection rule.

In some embodiments, selectively deactivating one of the SL BWP and the active UL BWP includes deactivating the SL BWP in response to none of the one or more UL BWP configurations being associated with a numerology that matches that of the SL BWP.

In some embodiments, the first method includes receiving a control message from a network entity, the control message activating the SL BWP. In such embodiments, selectively deactivating one of the SL BWP and the active UL BWP may include deactivating the active UL BWP in response to activating the SL BWP according to the control message. In other embodiments, selectively deactivating one of the SL BWP and the active UL BWP may include switching from the active UL BWP to a second UL BWP that has a numerology that matches that of the SL BWP in response to activating the SL BWP according to the control message.

In some embodiments, the first method includes receiving a control message from a network entity, the control message activating a configured UL BWP being associated with a different numerology than the SL BWP. In such embodiments, selectively deactivating one of the SL BWP and the active UL BWP may include deactivating the SL BWP in response to activating the UL BWP according to the control message.

In some embodiments, selectively deactivating one of the SL BWP and the active UL BWP includes providing a communication gap between UL operation and SL operation and adjusting (e.g., retuning and/or reconfiguring) a transceiver to switch between the first numerology and second numerology during the communication gap.

In some embodiments, the first method includes determining a priority of the SL BWP with respect to the active UL BWP. In such embodiments, selectively deactivating one of the SL BWP and the active UL BWP includes deactivating a lower priority one of the SL BWP and the active UL BWP.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base station for wireless communication, comprising:
at least one memory; and
at least one processor coupled with the at least one memory and configured to cause the base station to:
transmit a first configuration for one or more uplink bandwidth parts (BWPs), for a carrier of a serving cell, wherein at least one uplink BWP of the one or more uplink BWPs is an active uplink bandwidth part (BWP) associated with a first numerology; and
transmit a second configuration for a sidelink BWP for the carrier of the serving cell, wherein the sidelink BWP is associated with a second numerology, wherein the sidelink BWP is deactivated in response to the first numerology being different than the second numerology.

2. The base station of claim 1, wherein the at least one processor is configured to cause the base station to transmit a message comprising the first configuration and the second configuration.

3. The base station of claim 1, wherein the at least one processor is configured to cause the base station to:
transmit an indication to switch to a second uplink BWP associated with the second numerology, wherein the sidelink BWP is activated in response to the switch to the second uplink BWP.

4. The base station of claim 1, wherein the at least one processor is configured to cause the base station to:
transmit a control message that signals activation of the sidelink BWP, wherein the active uplink BWP is deactivated in response to the transmitted control message.

5. The base station of claim 1, wherein the at least one processor is configured to cause the base station to:
transmit a control message that signals an activation of the sidelink BWP, wherein the active uplink BWP is deactivated in response to the first numerology being different than the second numerology.

6. The base station of claim 1, wherein the at least one processor is configured to cause the base station to:
transmit a control message that signals an activation of a configured uplink BWP associated with a different numerology than the sidelink BWP,
wherein the sidelink BWP is deactivated in response to the activation of the configured uplink BWP according to the control message.

7. A processor for wireless communication, comprising:
at least one controller coupled with at least one memory and configured to cause the processor to:
transmit a first configuration for one or more uplink bandwidth parts (BWPs), for a carrier of a serving cell, wherein at least one uplink BWP of the one or more uplink BWPs is an active uplink bandwidth part (BWP) associated with a first numerology; and transmit a second configuration for a sidelink BWP for the carrier of the serving cell, wherein the sidelink BWP is associated with a second numerology, wherein the sidelink BWP is deactivated in response to the first numerology being different than the second numerology.

8. The processor of claim 7, wherein the at least one controller is configured to cause the processor to transmit a message comprising the first configuration and the second configuration.

9. The processor of claim 7, wherein the at least one controller is configured to cause the processor to:
transmit an indication to switch to a second uplink BWP associated with the second numerology, wherein the sidelink BWP is activated in response to the switch to the second uplink BWP.

10. The processor of claim 7, wherein the at least one controller is configured to cause the processor to:
transmit a control message that signals activation of the sidelink BWP, wherein the active uplink BWP is deactivated in response to the transmitted control message.

11. The processor of claim 7, wherein the at least one controller is configured to cause the processor to:
transmit a control message that signals an activation of the sidelink BWP, wherein the active uplink BWP is deactivated in response to the first numerology being different than the second numerology.

12. The processor of claim 7, wherein the at least one controller is configured to cause the processor to:
transmit a control message that signals an activation of a configured uplink BWP associated with a different numerology than the sidelink BWP,
wherein the sidelink BWP is deactivated in response to the activation of the configured uplink BWP according to the control message.

13. A method performed by a base station, the method comprising:
transmitting a first configuration for one or more uplink bandwidth parts (BWPs), for a carrier of a serving cell, wherein at least one uplink BWP of the one or more uplink BWPs is an active uplink BWP associated with a first numerology; and
transmitting a second configuration for a sidelink BWP, for the carrier of the serving cell, wherein the sidelink BWP is associated with a second numerology, wherein the sidelink BWP is deactivated in response to the first numerology being different than the second numerology.

14. The method of claim 13, further comprising transmitting a message comprising the first configuration and the second configuration.

15. The method of claim 13, further comprising:
transmitting an indication to switch to a second uplink BWP associated with the second numerology, wherein the sidelink BWP is activated in response to the switch to the second uplink BWP.

16. The method of claim 13, further comprising:
transmitting a control message that signals activation of the sidelink BWP, wherein the active uplink BWP is deactivated in response to the transmitted control message.

17. The method of claim 13, further comprising:
transmitting a control message that signals an activation of the sidelink BWP, wherein the active uplink BWP is deactivated in response to the first numerology being different than the second numerology.

18. The method of claim 13, further comprising:
transmitting a control message that signals an activation of a configured uplink BWP associated with a different numerology than the sidelink BWP,
wherein the sidelink BWP is deactivated in response to the activation of the configured uplink BWP according to the control message.

* * * * *